(12) United States Patent
    Dalum

(10) Patent No.: US 7,517,169 B2
(45) Date of Patent: Apr. 14, 2009

(54) ROTATABLE LINK

(75) Inventor: Hans Jørgen Dalum, Vodskov (DK)

(73) Assignee: Ergonomic Solutions International Ltd., Surrey (GB)

( * ) Notice: Subject to any disclaimer, the term of this patent is extended or adjusted under 35 U.S.C. 154(b) by 329 days.

(21) Appl. No.: 10/517,642

(22) PCT Filed: Jun. 24, 2003

(86) PCT No.: PCT/DK03/00433

§ 371 (c)(1),
(2), (4) Date: Oct. 7, 2005

(87) PCT Pub. No.: WO04/001043

PCT Pub. Date: Dec. 31, 2003

(65) Prior Publication Data

US 2006/0107491 A1    May 25, 2006

(30) Foreign Application Priority Data

Jun. 24, 2002 (DK) .......................... PA 2002 00969

(51) Int. Cl.
*F16C 11/00* (2006.01)
(52) U.S. Cl. ...................... 403/145; 403/146; 403/150; 403/157; 248/139

(58) Field of Classification Search ............... 403/78, 403/79, 81, 145, 146, 150, 151, 152, 157, 403/158, 161, 162; 248/139, 291.1
See application file for complete search history.

(56) References Cited

U.S. PATENT DOCUMENTS

| | | | | |
|---|---|---|---|---|
| 1,015,347 A | * | 1/1912 | Schnaus | 403/162 |
| 1,524,702 A | * | 2/1925 | Fleischer | 403/150 |
| 3,851,982 A | * | 12/1974 | See | 403/224 |
| 4,077,655 A | * | 3/1978 | Skahill | 280/756 |
| 4,135,372 A | * | 1/1979 | Benson | 464/11 |
| 4,192,622 A | * | 3/1980 | Stecklein | 403/146 |
| 4,951,349 A | * | 8/1990 | Dietrich et al. | 16/228 |
| 5,154,382 A | | 10/1992 | Hoshino | |
| 5,599,056 A | * | 2/1997 | Schmitt | 403/158 |

* cited by examiner

*Primary Examiner*—Michael P Ferguson
(74) *Attorney, Agent, or Firm*—William J. Sapone; Coleman Sudol Sapone P.C.

(57) ABSTRACT

The invention relates to a rotatable link, which may be incorporated in an upright. The upright may be used in connection with a support for a card terminal. The rotatable link may be characterized as a rotary friction link. Compressive forces caused by a mechanical tension in a pipe are transferred via two first objects to a second object clamped between them. The two first objects are secured and partly built into the pipe, and the second object is rotatable relative to the pipe. The second object constitutes a rotatable link part on which a plate may be welded to provide an upright.

12 Claims, 4 Drawing Sheets

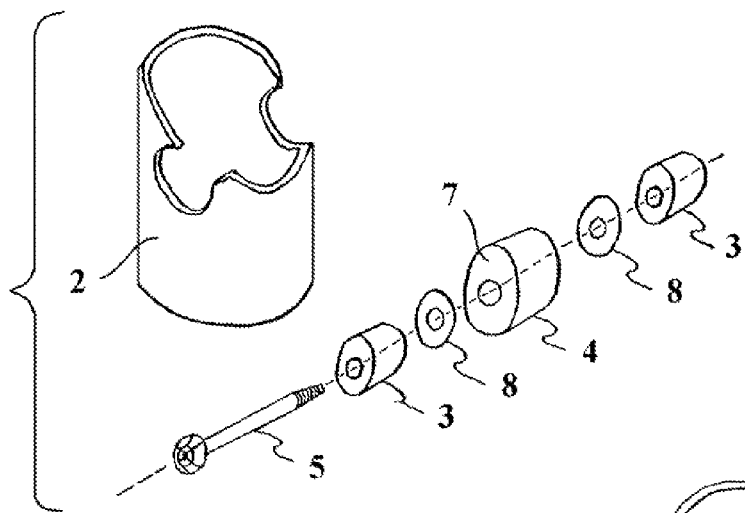
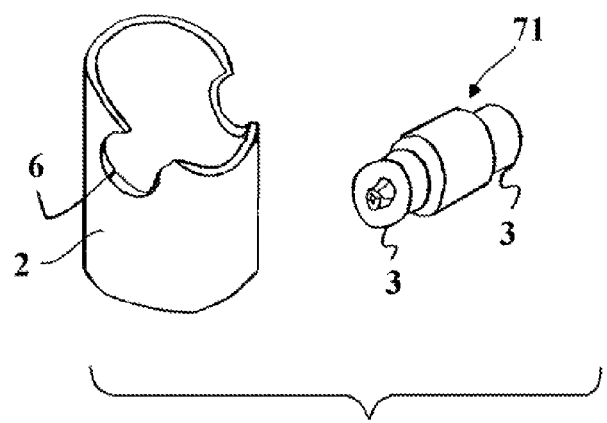
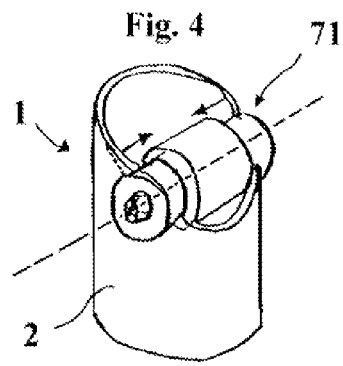

ROTATABLE LINK

TECHNICAL FIELD

The invention relates to a rotatable link, e.g. for use in connection with a support for a piece of hardware, such as a card terminal. Moreover, the invention relates to a rotatable upright. In addition, the invention relates to use of a rotatable upright for the mounting thereon of an object, such as a piece of hardware, e.g. a card terminal.

BACKGROUND

Rotatable links, such as ball bearings, are known. A special type of ball bearing has an applied tension between the balls in the link and the face on which they move during rotation. This applied tension results in an increased friction in the movement of the balls, and the link may be characterized as sluggish in the rotary movement. However, the friction decreases with use of the link so that the sluggishness is reduced, and frequent adjustments of the applied tension are required to maintain the sluggishness.

OBJECTS OF THE INVENTION

It is an object of the invention to provide a rotatable link which requires fewer tension adjustments during the service life of the link.

It is an object of the invention to provide a rotatable link which is inexpensive to manufacture.

It is an object of the invention to provide a rotatable upright having a plate so that the plate may be moved by hand in a rotary movement.

It is an object of the invention to provide a rotatable link for use with a plate on which a piece of hardware, such as a card terminal, may be secured, and the plate is additionally provided with a strap, handle or the like so that the strap, handle or the like on the plate may be gripped by hand, and the plate may be moved in said rotary movement about the link.

It is an object of the invention to provide a rotatable link which, in addition to being sufficiently slack to be adjusted by hand, is also suitably tight so that a plate mounted on the rotatable link maintains its position after forces have been exerted by hand, even if heavy objects are mounted on the plate and a moment is thus produced about the axis of the rotatable link.

It is an object of the invention that the use of the link only gives rise to fewer tension adjustments of the link, even after many repetitions of the rotary movement of the link.

It is an object of the invention that an object may be placed on an upright with the object in a first position, and that the object may be brought to a second position by rotary movements, and that the second position is maintained after the rotary movements have been performed, and the object is operated by users who want an individual setting of the position, such as wheelchair users and non-wheelchair users, where the position is changed by the two types of users.

Further, it is an object of the invention to be able to incorporate a link having the above-mentioned properties, so that it is located transversely to and partially inside a pipe opening so as to be partially concealed as viewed from the outside of the pipe.

In addition, it is an object of the invention that the plate must be capable of being rotated by a range of at least about 40° about the axis of the link.

It has been attempted to achieve these objects with the rotatable link and rotatable upright as described hereafter.

According to an aspect of the present invention, there is provided a rotatable link.

The rotatable link may be described as a rotary friction link. The rotary link has a certain sluggishness which is the result of friction in the parts of the link.

In one embodiment, the pipe is a pipe stub which is short measured in the longitudinal direction relative to the diameter of the pipe. In one embodiment, the pipe is round. The pipe may also be elliptic. The pipe may also be made of metal, such as a steel alloy. The pipe may be deformed elastically. The thickness of the pipe depends on the material of the pipe and on the load which the link is to be capable of carrying and rotating. The pipe has two ends which each have a rim. Part of one rim constitutes contact faces for the first objects. The rim may be shaped so as to form a support for the first objects in order to create contact along the first object in, for example, 25% or more of the circumference of the first object, 50% or more of the circumference of the first object, or 75% or more of the circumference of the first object. The remaining part of the one rim constitutes two rim sections. The rim sections may be configured such that they have notches and cut-outs therein. In one embodiment, the one rim section forms part of a plane which forms an angle of 0-40° with the horizontal, such as 10-30° with the horizontal, and the other rim section is part of a plane which forms an angle of 40-80° with the horizontal, such as 50-70° with the horizontal. In one embodiment, a pawl is provided in the interior of the pipe, extending from the interior of the pipe wall inwards toward the center of the pipe.

In one embodiment, the first objects are cylinders. The first objects may have two end faces of essentially the same size. In another embodiment, the first objects taper in the longitudinal axis of the object, so that one end face is smaller than the other end face. In one embodiment, the contour of the first objects are curved and may have a convex or a concave contour, while, in another embodiment, the contour is essentially rectilinear.

The first objects may be secured to the pipe edge by welding or soldering, e.g. TIG-welding, or another form of attachment.

In one embodiment, the second object is a cylinder. In one embodiment, the second object is a regular cylinder having a rectilinear contour and end faces of essentially the same size. In another embodiment, the contour of the object is curved and may be convex or concave. The rims of each of the end faces of the second object may be formed by e.g. milling so that the rim has no sharp edges or burrs.

In one embodiment, the attachment means is a screw. The screw mates with a thread on one of the two first objects. The attachment means has a diameter which allows it to pass through the bores in the objects, and the diameter is essentially equal to the diameter of the bored hole in the objects.

In one embodiment, there are one or more points on the contour of the second object which are more remote from the axis of the attachment means, measured perpendicularly to the axis of the attachment means, than the distance of points on the contour of each the two first objects from the axis of the attachment means, measured perpendicularly from the axis of the attachment means.

In one embodiment, the area of an end face of a first object which is closest to the second object, is smaller than the area of the end faces of the second object.

In one embodiment, a unit is secured with its longitudinal direction perpendicular to the longitudinal direction of the pipe.

By assembling the first objects and the second object with the attachment means into a unit, it is ensured that the objects are kept together about a common axis which constitutes the axis of rotation of the link.

By providing a unit like the foregoing one and mounting it in a pipe, a simple and inexpensive rotatable link consisting of few components is provided.

When the mechanical tension in the pipe produces compressive forces from the walls of the pipe inwards toward the center of the pipe, the link becomes sufficiently slack for it to be affected by hand, while the link is also sluggish.

In addition, as a result of the mechanical tension in the pipe, the attachment means need not be tightened very much in the assembly of the objects, to achieve the desired sluggishness. Thus, the attachment means is not very prone to work loose, resulting in fewer tightening adjustments.

A mechanical tension in the pipe may be detected by separating the second object from the unit and then measuring the distance between the two first objects. If the distance between the two first objects is smaller, when the second object has been separated from the unit, than the length of the second object, this indicates that a mechanical tension was present in the pipe before the second object was separated from the unit. The distance and the length are measured in the direction of the bores.

According to one aspect of the present invention, there is provided a rotatable link which contains an apertured disc which is an object with a hole. In one embodiment, the apertured disc is an object having a small thickness relative to the size of the width of the disc. In one embodiment, the apertured disc is essentially circular.

The use of apertured discs results in a smoother operation of the link, among other things. In one embodiment, use is made of apertured discs to reduce the number of post tightening adjustments of the attachment means in the link. In one embodiment, the frictional forces in the link are essentially smoothed out in the entire range of rotation of the link by the use of apertured discs.

The apertured discs may be positioned with their faces in contact with an end face of the second object and an end face of the first object, or in contact with an end face of the second object and a second apertured disc face, or in contact with an end face of the first object and a second apertured disc face, or in contact with two different apertured disc faces. The apertured discs may be of the same size or of different sizes.

According to an aspect of the present invention, there is provided a rotatable link which uses four pairs of apertured discs.

According to an aspect of the present invention, there is provided a rotatable link having apertured discs which may be of the same material or of different materials.

In one embodiment, the apertured disc is a spring disc.

In one embodiment, there are one pair of apertured discs of one material and three pairs of apertured discs of another material.

In one embodiment, there are one pair of apertured discs of brass and three pairs of apertured discs of steel.

According to an aspect of the present invention, there is provided a rotatable upright which, in addition to being sufficiently slack to be affected by hand, is also suitably tight so that the plate maintains its position after forces have been exerted by hand, and even if objects are mounted on the plate, and a moment is produced about the axis of the rotatable link.

The plate may be secured to the rotatable link part by welding. In an embodiment, the plate is secured with a large face to the rotatable link part.

According to an aspect of the present invention, there is provided a rotatable upright where forces may readily be applied by hand to effect a rotary movement of the rotatable link by gripping the handle. The handle may be shaped as a strap or the like.

According to an aspect of the present invention, there is provided a rotatable upright which allows simple mounting of the rotatable upright on a rod to be achieved.

The rod has an outside diameter which is approximately equal to and smaller than the inside diameter of the pipe. The pipe may be mounted on other objects, such as other rods in extension of the rod in one and the same direction measured along the longitudinal directions of the rod and the object.

In one embodiment, the rotatable upright may perform a rotary movement of the pipe about the rod. Thus, a rotatable upright is achieved which has two rotary axes that are essentially perpendicular to each other.

According to an aspect of the present invention, there is provided a method for ensuring that an object may be placed on an upright with the object in a first position, and that the object may be brought to a second position by rotary movements, and that the second position is maintained after rotary movements have been performed.

The method is particularly advantageous when the object is a piece of hardware, such as a card terminal which is to be operated by wheelchair users as well as non-wheelchair users, where the position is changed by the two types of users when using the hardware.

According to an aspect of the present invention, there is provided a method where the attachment of the unit to the pipe is performed by welding. In one embodiment, the welding ensures that the pipe is deformed elastically, and that the elastic deformation thereby contributes to a mechanical tension in the pipe.

In one embodiment, a mechanical tension in the pipe may be achieved by first applying a mechanical deformation to the pipe, thereby deforming the pipe mechanically, and then attaching the unit so that a mechanical tension is maintained after the application of the mechanical deformation has been discontinued.

According to an aspect of the present invention, there is provided a method where the mechanical tension of the pipe may be changed by adding/removing one or more pairs of discs after the unit has been secured to the pipe. This provides a simple manner in which the mechanical tension in the pipe may be changed.

BRIEF DESCRIPTION OF THE DRAWINGS

Embodiments of the invention will be illustrated below by means of examples with a detailed description of preferred embodiments. Reference is made to the figures in which:

FIG. 2 illustrates individual parts incorporated in a link in an embodiment of the invention;

FIG. 3 illustrates individual parts incorporated in a link in an embodiment of the invention;

FIG. 4 shows an embodiment of the invention, illustrating a rotatable link;

DETAILED DESCRIPTION OF THE INVENTION

Figure 1:
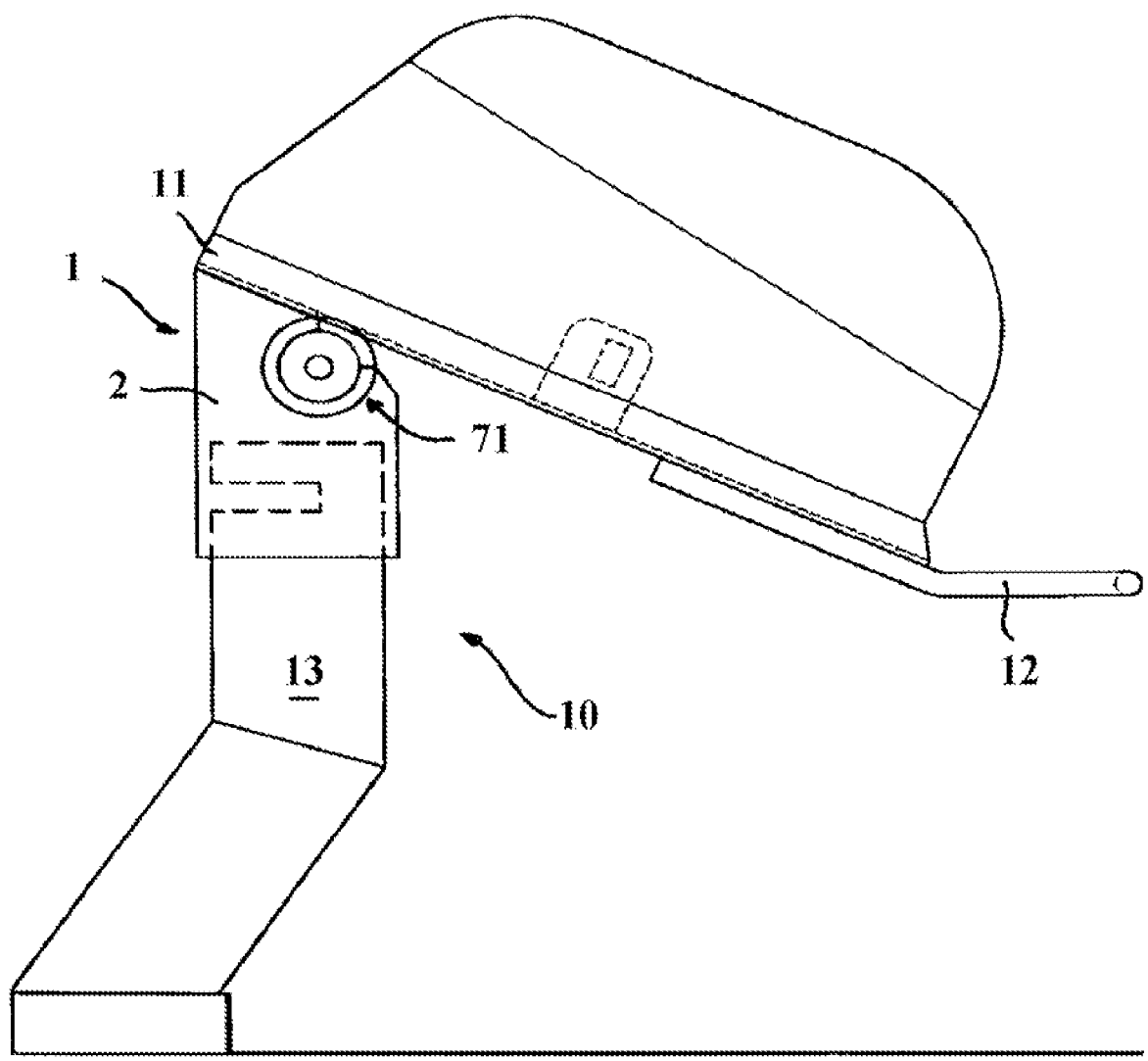
FIG. 1 shows an embodiment of the invention, illustrating an upright comprising a rotatable link, a plate and a handle.

FIG. 1 shows a plate 11 on a link 1 as well as a strap 12 on the plate 11. See FIGS. 2-4 for the following description of the link 1. The link 1 is composed of: a through-going machine screw 5 having therearound two small cylinders 3 of a first diameter, two discs 8 of the first diameter and a large cylinder 4 of a second diameter, the second diameter being larger than the first diameter. A round hole of approximately the same diameter as the diameter of the screw 5 has been milled in both the two small cylinders 3, the two discs 8 and the large cylinder 4, the machine screw 5 extending through the hole. The large cylinder 4 is present on the longitudinal axis of the machine screw 5, approximately centrally thereon, and the two discs 8 and the small cylinders 3 are arranged symmetrically around the large cylinder 4 such that a disc 8 is disposed between each of the small cylinders 3 and the large cylinder 4. One of the small cylinders 3 has mating threads for receiving the machine screw 5 therein. The small cylinders 3 and the large cylinder 4 are of compressed round steel and the discs 8 are of brass.

The small cylinders 3, the discs 8 and the large cylinder 4 are assembled with the machine screw 5, see FIG. 2, and constitutes a unit 71 as described above and indicated in FIG. 3. The above-mentioned unit 71 is welded to a pipe stub 2, see FIG. 3. At one end the pipe stub 2 is cut at an angle of about 20° perpendicularly to the longitudinal direction of the pipe stub 2, and two openings 6 are milled in this inclined pipe edge. The two openings 6 in the inclined pipe edge form the contact face for welding to the two small cylinders 3 of the unit 71. The link 1 is shown assembled and mounted in FIG. 4. In the mounted state, the pipe 2 is slightly elastically deformed by being expanded slightly in the direction of the machine screw 5. This gives rise to a compressive force of an elastic nature on the unit 71 from the pipe stub 2 inwards toward the center of the unit 71, see the arrows of force in FIG. 4. In the mounted link 1, it is only the large cylinder 4 which is rotatable (and partly the discs 8), whereas the two small cylinders 3 are fixed and integrated with the pipe stub 2.

Welding of the plate 11 takes place on the large cylinder 4, see FIG. 1 for a plate 11 welded on a link 1.

Mode of Operation

The pipe stub 2 applies a force to the unit 71. The force is generated by the elastic deformation of the pipe stub 2 and acts along the axis of the link 1 from both sides of the pipe stub 2 inwards toward the center of the unit 71.

The machine screw 5 is tightened firmly, which also produces compressive forces that act inwards and compress the unit 71.

The total compressive force on the unit 71 causes a certain desirable sluggishness in the link 1, as described in the above-mentioned objects of the invention. The sluggishness is partly brought about by applied forces from the pipe stub 2, and the sluggishness is therefore partly dependent on the compressive forces produced by the tightening of the machine screw 5. The machine screw 5 primarily has the effect of holding the parts of the unit 71 together rather than the effect of causing sluggishness in the link 1. The frictional forces in the link 1 during rotation act, inter alia, on the machine screw 5 in the direction of rotation, and the frictional forces are assumed to be proportional to the force by which the screw 5 is tightened. If a very firmly tightened machine screw 5 were used, this would cause great frictional forces that might undesirably loosen the screw 5. The use of the compressive forces of the pipe stub 2 means that the screw 5 need not be tightened very much for the given desired sluggishness. In this example, the screw 5 thus does not tend to loosen, which results in fewer tightening adjustments.

In this example, the discs 8 neutralize the frictional forces in the link 1 in that the discs 8 are made of a softer material than the cylinder parts 3, 4.

In this example, the larger diameter of the large cylinder 4 relative to the diameter of both the small cylinders 3 and the discs 8 makes it possible to achieve a point on the link 1 for the welding of the plate 11, which has been lifted clear of the partially concealed link 1 in the pipe opening, whereby the plate 11 may be rotated through the desired range in an angle of rotation of about 40°, see FIG. 5.

Figure 6A:
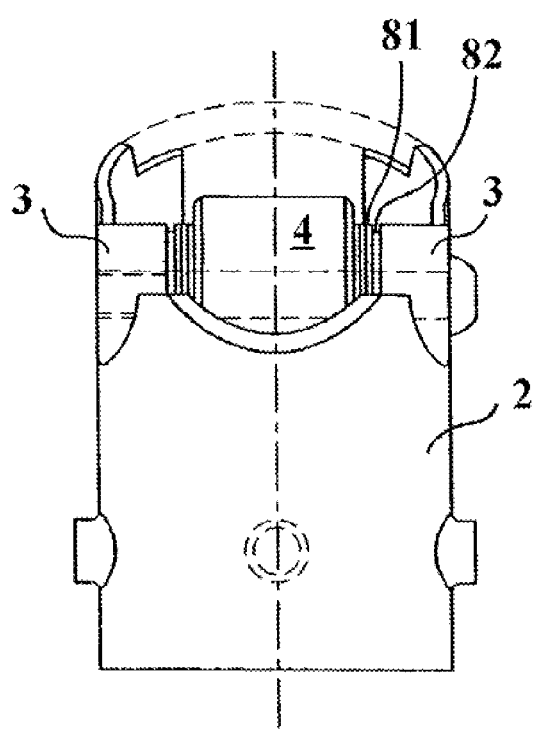
FIG. 6a shows an embodiment of the invention, illustrating another rotatable link seen perpendicular to the axis of rotation.
Figure 6B:
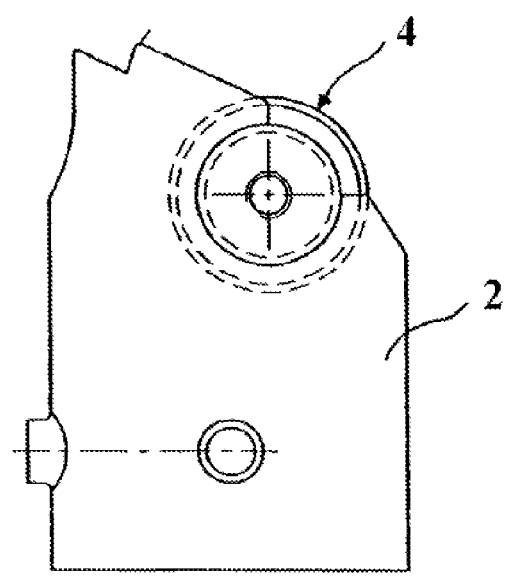
FIG. 6b shows an embodiment of the invention, illustrating another rotatable link seen along the axis of rotation.

FIGS. 6a and 6b show an embodiment of a rotatable link 1, where, in addition to two first cylinders 3 and the second cylinder 4, apertured discs 8 are provided in the rotatable link 1. Between a first cylinder 3 and a second cylinder 4 and in the mentioned order and on each side of the second cylinder 4, there are: an apertured disc 82 of a first material and three apertured discs 81 of a second material. In this example the first material is brass, and the second material is steel. The second material may be spring steel. The second cylinder 4 and the two first cylinders 3 are, for example, made of sulphur-alloyed free-cutting steel. The pipe 2 is cut with two rim sections, and the upper rim section is produced such that it comprises a step. One rim section is part of a plane that forms an angle of about 20° with the horizontal, and the other rim section is part of a plane that forms an angle of about 60° with the horizontal. In this example, there is a hole in the wall of the pipe 2 in its lower area shown by a cantilever in profile in FIG. 6b. A pawl may be inserted through this hole into the interior of the pipe 2, extending from the interior of the pipe wall inwards toward the center of the pipe 2. If the pipe 2 is mounted on a rod 13 having a slot, the pawl has the function of controlling the rotary movement in that the pawl is present in the slot during the rotary movement. See FIG. 1 for an example of a slot in a rod 13.

Figure 5A:
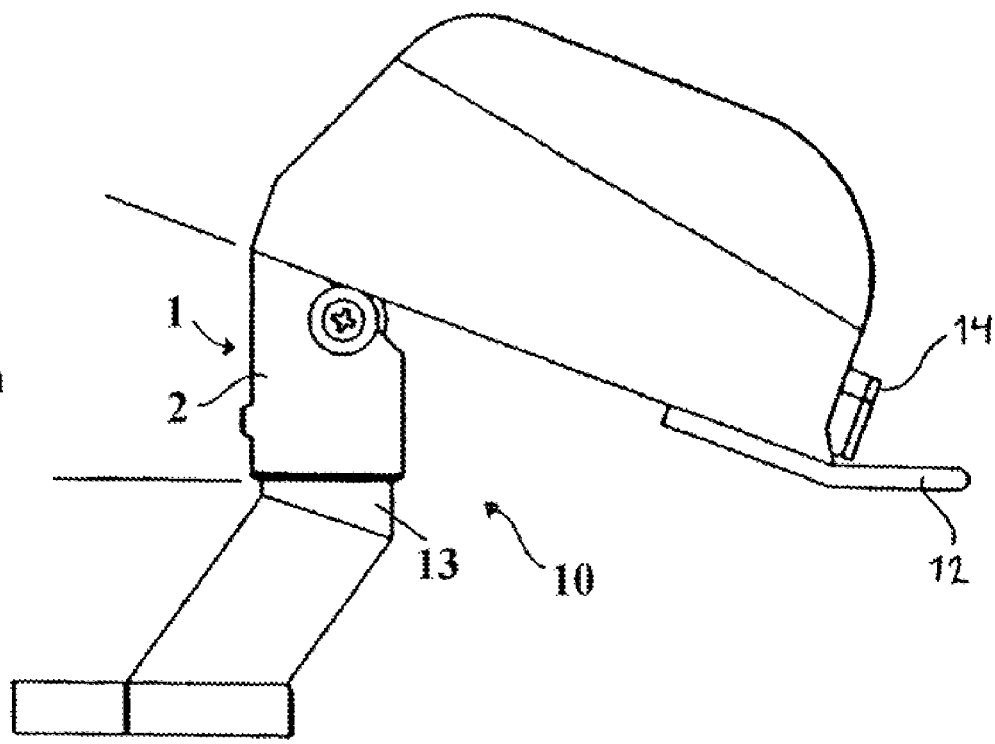
FIG. 5a shows an embodiment of the invention, illustrating an upright in a first position.
Figure 5B:
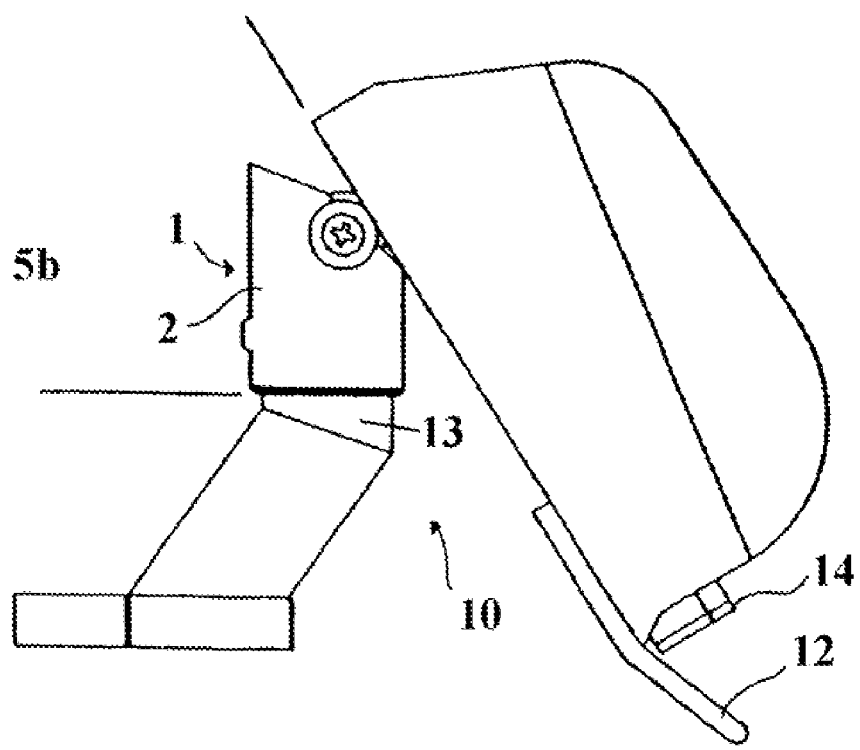
FIG. 5b shows an embodiment of the invention, illustrating an upright in a second position.

FIGS. 1, 5a and 5b show examples of uprights 10 in embodiments of the invention. FIG. 1 shows an upright 10 mounted on a horizontal face. A description of the upright 10 is given below, based on the mounted part of the upright 10 on the horizontal face. The upright 10 comprises a foot secured to an object, which is in turn secured to the rod 13. The object, shown here as a rod part, is secured in extension of the rod 13 with its longitudinal direction different from the longitudinal direction of the rod 13. The rod 13 is a circular hollow pipe and has a slot configured as a section in the rod 13 near the end of the rod 13, and the rod 13 has an outside diameter approximately equal to and smaller than the inside diameter of the pipe 2. A pipe 2 is disposed around and connected to the rod 13. A pawl (not shown) may be mounted in the pipe 2, engaging the slot such that the pipe 2 is kept in its vertical position in that the pawl is in contact with the edges of the slot, and such that, simultaneously with the vertical attachment, it is possible to rotate the pipe about the longitudinal direction of the pipe 2. The pipe 2 has a secured unit 71, and together they form a rotatable link 1. A plate 11 is secured on the rotatable link 1, welded to the rotatable link part of the unit 71. The plate has secured thereto a handle 12 which a user may grip and move the plate 11 in a rotary movement about the axis of the rotatable link part and/or about the axis along the longitudinal direction of the pipe 2. An object (not shown), such as a piece of hardware, e.g. a card terminal, may be mounted or placed on the plate. A screen capable of screening the hardware is shown mounted on the plate.

FIGS. 5a and 5b show an example of an upright 10. An object 14 is mounted on the upright 10. In FIG. 5a, the upright 10 has a position where the plate 11 has been rotated maximally in one direction about the axis of the rotatable link part, such that it hits an upper part of the rim of the pipe 2, said upper part forming a rim section. This rim section is part of a plane having an inclination of about 20° with the horizontal. In FIG. 5b, the upright 10 has a position in which the plate 11 has been rotated maximally in the other direction about the axis of the rotatable link part, such that it hits a lower part of the rim of the pipe 2, the lower part forming a rim section. When contacting this rim section, the plate has an inclination of about 60° with the horizontal.

The invention claimed is:

1. A rotatable link assembly comprising;
    a pipe having a rim including a pair of diametrically opposed slotted openings therein, the slotted openings defining a pair of opposed deformable rim portions,
    a pair of rim mounting fittings, each fitting having a longitudinal bore passing therethrough, each of the rim mounting fittings being fixed to a corresponding deformable rim portion within a respective one of said slotted openings,
    a rotatable link having a longitudinal bore, disposed between the first and second rim mounting fittings, the slotted openings, the fitting longitudinal bores and rotatable link bore being in coaxial alignment, the rotatable link being rotatable relative to the rim mounting fittings fixed to the deformable rim portions,
    a threaded attachment means extending through said slotted openings and said coaxial fitting and rotatable link longitudinal bores for assembling the rim mounting fittings and the rotatable link into a unit, mounted to the deformable rim portions which are deformed thereby, the deformed rim portions providing a mechanical tension which is transferred as compressive forces in the longitudinal direction of the attachment means to the rim mounting fittings which frictionally engage the rotatable link disposed therebetween, the rotatable link having an axis of rotation along the longitudinal axis of the threaded attachment means, such that tightening or loosening the threaded attachment means varies the deformation of the rim portions and adjusts the compressive and frictional forces exerted on the rotatable link to adjust the ease of rotating the rotatable link.

2. The rotatable link assembly according to claim 1 further comprising:
    one or more pairs of washers, each respective washer of each pair of washers being disposed on a respective side of the rotatable link between the rotatable link and the rim mounting fittings, the attachment means extending through holes in the washers.

3. The rotatable link assembly according to claim 2 wherein one or more pairs of the washers are spring washers.

4. The rotatable link assembly of claim 2 wherein two or more pairs of washers are provided.

5. The rotatable link assembly according to claim 2 wherein two or more pairs of washers are provided, and at least one pair of washers are spring washers.

6. The rotatable link assembly according to claim 2 wherein the washers are made of a material selected from the group consisting of plastics, metals, brass and steel.

7. The rotatable link assembly according to claim 1 further comprising a plate secured on the rotatable link, such that the plate is rotatable together with the rotatable link, the amount of compressive force exerted on the rotatable link affecting the force required to adjust a position of the plate.

8. The rotatable link assembly according to claim 7 further comprising a handle secured to the plate.

9. The rotatable link assembly according to claim 7 further comprising a support, said pipe being mounted to said support, a longitudinal direction of the pipe being essentially parallel to a longitudinal direction of the support.

10. A method of manufacturing a rotatable link assembly comprising:
    assembling a unit consisting of two rim mounting fittings, each having a longitudinal bore, a rotatable link disposed between the rim mounting fittings, the rotatable link having a longitudinal bore;
    securing the unit within a pair of diametrically opposed slotted openings provided in a rim of a pipe, the slotted openings defining a pair of opposed deformable rim portions, by fixing each of the rim mounting fittings to a corresponding deformable rim portion within a respective one of the slotted openings, the slotted openings, the fitting longitudinal bores and rotatable link bore being in coaxial alignment, a threaded attachment means passing through the slotted openings, the rim mounting fitting longitudinal bores and the rotatable link bore for assembling the rim mounting fittings and the rotatable link together, the rotatable link being rotatable relative to the rim mounting fittings, the deformable rim portions being deformed thereby for providing a mechanical tension which is transferred as compressive forces to the rim mounting fittings which engage the rotatable link disposed therebetween, thereby applying a frictional force to the rotatable link and,
    tightening or loosening the threaded attachment means for adjusting the compressive and frictional forces exerted on the rotatable link to adjust the ease of rotating the rotatable link.

11. The method according to claim 10 further comprising providing one or more pairs of washers, each washer of each pair of washers disposed on a respective side of the rotatable link, between the rotatable link and the rim mounting fittings, the threaded attachment means extending through holes in each washer.

12. The method according to claim 11 wherein one or more pairs of the washers are spring washers.

* * * * *